(12) United States Patent
Choi et al.

(10) Patent No.: US 9,535,190 B2
(45) Date of Patent: Jan. 3, 2017

(54) PHOTOSENSITIVE RESIN COMPOSITION AND COLOR FILTER USING THE SAME

(71) Applicant: Samsung SDI Co., Ltd., Yongin-si (KR)

(72) Inventors: Se-Young Choi, Suwon-si (KR); Ju-Ho Jung, Suwon-si (KR); Myoung-Youp Shin, Suwon-si (KR); Nam-Gwang Kim, Suwon-si (KR); Hwan-Sung Cheon, Suwon-si (KR); Seung-Jib Choi, Suwon-si (KR); Kyung-Hee Hyung, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 58 days.

(21) Appl. No.: 14/470,017

(22) Filed: Aug. 27, 2014

(65) Prior Publication Data

US 2015/0192699 A1   Jul. 9, 2015

(30) Foreign Application Priority Data

Jan. 9, 2014   (KR) .......................... 10-2014-0003045

(51) Int. Cl.
*G02B 1/04* (2006.01)
*G02B 5/23* (2006.01)
*G02B 5/22* (2006.01)

(52) U.S. Cl.
CPC ................. *G02B 1/04* (2013.01); *G02B 5/223* (2013.01)

(58) Field of Classification Search
CPC ................................ G02B 1/04; G02B 5/223
USPC ........................................................ 252/586
See application file for complete search history.

(56) References Cited

U.S. PATENT DOCUMENTS

| 6,770,405 | B2 | 8/2004 | Ueda et al. |
| 8,758,966 | B2 | 6/2014 | Cho et al. |
| 2011/0183254 | A1* | 7/2011 | Shoshi ............... G03G 15/10 430/112 |

FOREIGN PATENT DOCUMENTS

| EP | 2696236 A1 | 2/2014 | |
| JP | 07-140654 A | 6/1995 | |
| JP | 10-254133 A1 | 9/1998 | |
| JP | 2002-014222 A | 1/2002 | |
| JP | 2006-241217 | * 9/2006 | ............ C09B 47/12 |
| JP | 2006-241217 A | 9/2006 | |
| JP | 3909807 B2 | 4/2007 | |
| JP | 4383007 B2 | 12/2009 | |
| JP | 2011-197670 A | 10/2011 | |
| JP | 2012-027089 A | 2/2012 | |
| KR | 10-2009-0032003 A | 3/2009 | |
| KR | 10-2009-0058351 A | 6/2009 | |
| KR | 10-2010-0063537 A | 6/2010 | |
| KR | 10-2013-0039949 A | 4/2013 | |
| KR | 10-2013-0060035 A | 6/2013 | |
| TW | 201319741 | 5/2013 | |
| TW | 201337457 | 9/2013 | |
| WO | 20131115164 A1 | 8/2013 | |

* cited by examiner

*Primary Examiner* — Ling Choi
*Assistant Examiner* — Chun-Cheng Wang
(74) *Attorney, Agent, or Firm* — Additon, Higgins & Pendleton, P.A.

(57) ABSTRACT

Disclosed are a photosensitive resin composition including (A) an acrylic-based binder resin; (B) a photopolymerizable monomer; (C) a photopolymerization initiator; (D) a colorant including a dye represented by the following Chemical Formula 1, wherein in Chemical Formula 1, each substituent is the same as defined in the detailed description; and (E) a solvent, and a color filter using the same.

[Chemical Formula 1]

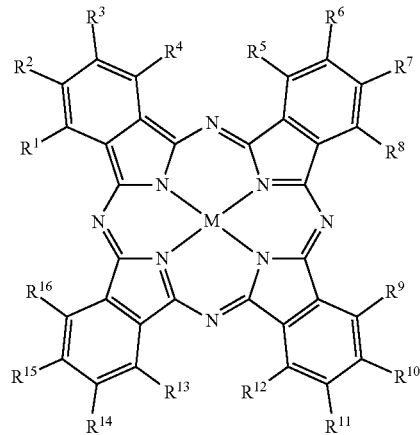

12 Claims, No Drawings

PHOTOSENSITIVE RESIN COMPOSITION AND COLOR FILTER USING THE SAME

CROSS-REFERENCE TO RELATED APPLICATION

This application claims priority to and the benefit of Korean Patent Application No. 10-2014-0003045 filed in the Korean Intellectual Property Office on Jan. 9, 2014, the entire disclosure of which is incorporated herein by reference.

FIELD OF THE INVENTION

This disclosure relates to a photosensitive resin composition and a color filter using the same.

BACKGROUND

Color filters are used for liquid crystal displays (LCDs), optical filters for cameras, and the like. Color filters may be manufactured by coating a fine region colored with three or more colors on a charge coupled device or a transparent substrate. This colored thin film can be manufactured using a pigment dispersion method, and the like. A color photosensitive resin composition used for manufacturing a color filter by the pigment dispersion method generally includes a binder resin, a photopolymerizable monomer, a photopolymerization initiator, a pigment, a solvent, other additives, and the like.

The pigment used in the pigment dispersion method can have a limit in securing excellent luminescence. Accordingly, there have been efforts to improve luminescence characteristics by improving the binder resin. For example, Japanese Patent Laid-Open Pyeung 7-140654 and Pyeung 10-254133 use a carboxyl group-containing acrylic-based copolymer as the binder resin.

However, there is increased demand for a color filter having excellent luminance, heat resistance, and the like to meet high quality specifications, but current improvements of the pigment or the binder resin have not satisfied this increased demand. Accordingly, there is a need to improve luminescence characteristics and the like by adding other components rather than improving the pigment and the binder resin.

SUMMARY

One embodiment provides a photosensitive resin composition that can have excellent color characteristics and heat resistance due to high luminance.

Another embodiment provides a color filter manufactured using the photosensitive resin composition.

One embodiment provides a photosensitive resin composition including (A) an acrylic-based binder resin; (B) a photopolymerizable monomer; (C) a photopolymerization initiator; (D) a colorant including a dye represented by the following Chemical Formula 1; and (E) a solvent.

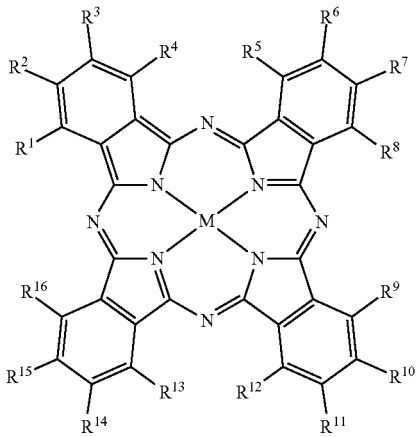

[Chemical Formula 1]

In the above Chemical Formula 1,
M is Cu, Co, Al, Zn, Ni, Pt, or Cr,
$R^1$ to $R^{16}$ are the same or different and are each independently hydrogen, halogen, a carboxyl group, a hydroxy group, substituted or unsubstituted C1 to C20 alkyl, substituted or unsubstituted C1 to C20 alkoxy, substituted or unsubstituted C3 to C20 cycloalkyl, substituted or unsubstituted C6 to C20 aryl, a substituted or unsubstituted C2 to C20 heterocyclic group, a sulfonyl group represented by the following Chemical Formula 2, or a sulfonyl group represented by the following Chemical Formula 3, with the proviso that at least one of $R^1$ to $R^4$, one of $R^5$ to $R^8$, at least one of $R^9$ to $R^{12}$ and at least one of $R^{13}$ to $R^{16}$ are independently a sulfonyl group represented by the following Chemical Formula 2 or a sulfonyl group represented by the following Chemical Formula 3.

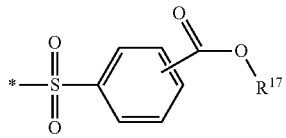

[Chemical Formula 2]

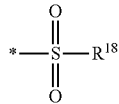

[Chemical Formula 3]

In the above Chemical Formula 2 and Chemical Formula 3,
$R^{17}$ and $R^{18}$ are the same or different and are each independently substituted or unsubstituted C1 to C20 alkyl.

In the above Chemical Formula 1, M may be Cu.

The dye may be a blue dye, for example a phthalocyanine-based blue dye.

The dye may be included in an amount of about 3 wt % to about 15 wt %, for example about 5 wt % to about 10 wt %, based on 100 wt % of the photosensitive resin composition.

The colorant may further include a pigment. The pigment and the dye may be used in a weight ratio of about 5:5 to about 9.9:0.1.

The acrylic-based binder resin may have a weight average molecular weight of about 6,000 g/mol to about 50,000 g/mol.

The acrylic-based binder resin may have an acid value of about 100 mgKOH/g to about 140 mgKOH/g.

The photosensitive resin composition may include about 1 wt % to about 40 wt % of the acrylic-based binder resin (A); about 1 wt % to about 30 wt % of the photopolymerizable monomer (B); about 0.1 wt % to about 10 wt % of the photopolymerization initiator (C); about 3 wt % to about 55 wt % of (D) the colorant; and a balance amount of the solvent (E).

The photosensitive resin composition may further include at least one additive selected from malonic acid; 3-amino-1,2-propanediol; a silane-based coupling agent having a vinyl group or a (meth)acryloxy group; a leveling agent; a fluorine-based surfactant; and/or a radical polymerization initiator.

Another embodiment of the present invention provides a color filter using the photosensitive resin composition. Other embodiments of the present invention are included in the following detailed description.

The photosensitive resin composition can have high luminance, and excellent color characteristics and heat resistance, and thus may be used in a color filter.

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, when a specific definition is not otherwise provided, the term "substituted" may refer to substitution with one or more substituents including halogen (F, Cl, Br, I), a hydroxy group, a C1 to C20 alkoxy group, a nitro group, a cyano group, an amine group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid or a salt thereof, C1 to C20 alkyl, C2 to C20 alkenyl, C2 to C20 alkynyl, C6 to C30 aryl, C3 to C20 cycloalkyl, C3 to C20 cycloalkenyl, C3 to C20 cycloalkynyl, C2 to C20 heterocycloalkyl, C2 to C20 heterocycloalkenyl, C2 to C20 heterocycloalkynyl, C3 to C30 heteroaryl, or a combination thereof, instead of at least one hydrogen.

As used herein, when a specific definition is not otherwise provided, the term "hetero" may refer to one substituted with at least one or more hetero atoms including N, O, S and/or P, instead of at least one C in a cyclic substituent.

As used herein, when a specific definition is not otherwise provided, "(meth)acrylate" refers to both "acrylate" and "methacrylate", and "(meth)acrylic acid" refers to both "acrylic acid" and "methacrylic acid".

As used herein, when a specific definition is not otherwise provided, the term "combination" refers to mixing or copolymerization.

As used herein, unless a specific definition is otherwise provided, a hydrogen atom is bonded at a position when a chemical bond is not drawn where a bond would otherwise appear.

As used herein, when a specific definition is not otherwise provided, "*" indicates a point where the same or different atom or chemical formula is linked.

A photosensitive resin composition according to one embodiment includes (A) an acrylic-based binder resin, (B) a photopolymerizable monomer, (C) a photopolymerization initiator, (D) a colorant, and (E) a solvent.

The colorant (D) includes a dye represented by the following Chemical Formula 1, and thus, the photosensitive resin composition including the dye may improve luminance, furthermore, enhance heat resistance and thus, realize excellent processing characteristics.

[Chemical Formula 1]

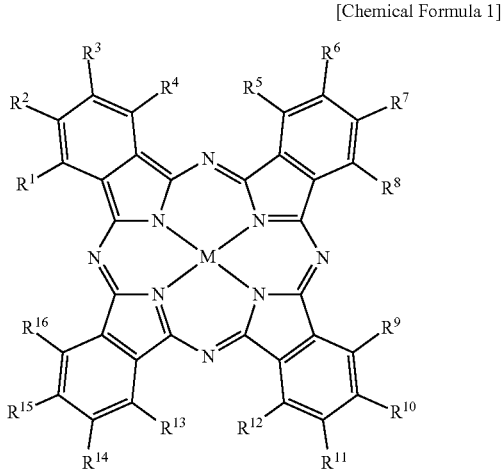

In the above Chemical Formula 1,

M is Cu, Co, Al, Zn, Ni, Pt, or Cr, $R^1$ to $R^{16}$ are the same or different and are each independently hydrogen, halogen, a carboxyl group, a hydroxy group, a substituted or unsubstituted C1 to C20 alkyl, substituted or unsubstituted C1 to C20 alkoxy, substituted or unsubstituted C3 to C20 cycloalkyl, substituted or unsubstituted C6 to C20 aryl, a substituted or unsubstituted C2 to C20 heterocyclic group, a sulfonyl group represented by the following Chemical Formula 2, or a sulfonyl group represented by the following Chemical Formula 3, with the proviso that at least one of $R^1$ to $R^4$, one of $R^5$ to $R^8$, at least one of $R^9$ to $R^{12}$ and at least one of $R^{13}$ to $R^{16}$ are independently a sulfonyl group represented by the following Chemical Formula 2 or a sulfonyl group represented by the following Chemical Formula 3.

[Chemical Formula 2]

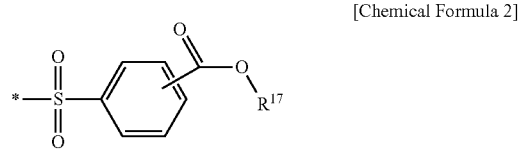

[Chemical Formula 3]

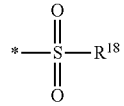

In the above Chemical Formula 2 and Chemical Formula 3, $R^{17}$ and $R^{18}$ are the same or different and are each independently substituted or unsubstituted C1 to C20 alkyl.

Hereinafter, each component is described in detail.

(D) Colorant

The colorant includes a dye represented by the above Chemical Formula 1, and for example, in the above Chemical Formula 1, M may be Cu.

When the dye is in a solution state, the dye has no particle or a very small particle having a primary particle diameter of about 1 nm to about 10 nm unlike the pigment having a particle and thus, may have excellent dissolubility for a solvent and high durability. In this way, when the dye has a smaller particle diameter than that of the pigment, light scattering is decreased, and as a result, a contrast ratio and luminance may be improved. Accordingly, the contrast ratio and luminance deterioration problem of a pigment dispersion method mainly used to manufacture a color filter may be compensated.

The dye having the above characteristics may realize high luminance and a high contrast ratio in a desired color coordinate and may be usefully used for a LCD (Liquid Crystal Display) color filter using a cold cathode fluorescent lamp (CCFL) or a light emitting diode (LED) as a backlight.

The dye may be a blue dye, for example a phthalocyanine-based blue dye. When the photosensitive resin composition includes a blue dye, for example a phthalocyanine-based blue dye along with a pigment, transmittance and a contrast ratio may be improved.

The photosensitive resin composition may further include a green dye besides the blue dye. Examples of the green dye may include without limitation octa (1,4,7,10-tetraoxaundecyl) Cu phthalocyanine, octa (1,4,7,10-tetraoxaundecyl) Co phthalocyanine, octa (1,4,7,10-tetraoxaundecyl) Al phthalocyanine, octa (1,4,7,10-tetraoxaundecyl) Zn phthalocyanine, octa (1,4,7,10-tetraoxaundecyl) Ni phthalocyanine, octa (1,4,7,10-tetraoxaundecyl) Pt phthalocyanine, octa (1,4,7, 10-tetraoxaundecyl) Cr phthalocyanine, and the like, and combinations thereof.

The photosensitive resin composition may include the dye in an amount of about 3 wt % to about 15 wt %, for example about 5 wt % to about 10 wt %, based on 100 wt % of the photosensitive resin composition. In some embodiments, the photosensitive resin composition may include the dye in an amount of about 3, 4, 5, 6, 7, 8, 9, 10, 11, 12, 13, 14, or 15 wt %. Further, according to some embodiments of the present invention, the amount of the dye can be in a range from about any of the foregoing amounts to about any other of the foregoing amounts.

When the dye is included in an amount of less than about 3 wt % based on 100 wt % of the composition, color characteristics may be remarkably deteriorated, while when the dye is included in an amount of greater than about 15 wt % based on 100 wt % of the composition, a problem of precipitating the dye and deteriorating heat resistance after baking and the like may occur.

On the other hand, the photosensitive resin composition according to one embodiment may include the dye along with a post-described pigment. The dye can have inherent spectrum characteristics in a particular wavelength region and synergism with a pigment expressing a particular color. Thus, a light transmittance and a transmittance width of a color filter formed of the photosensitive resin composition may be adjusted, and luminance, a contrast ratio, and the like as well as a color purity may be improved.

The colorant may further include a pigment.

Examples of the pigment may include without limitation red pigments, yellow pigments, blue pigments, green pigments, and the like, and combinations thereof.

The red pigment may be a compound having at least one azo group. Examples of the red pigment may include without limitation C.I. pigment red 254, C.I. pigment red 242, C.I. pigment red 214, C.I. pigment red 221, C.I. pigment red 166, C.I. pigment red 220, C.I. pigment red 248, C.I. pigment red 262, and the like in a color index, and may be used singularly or as a mixture of two or more.

Examples of the yellow pigment may include without limitation C.I. pigment yellow 139, C.I. pigment yellow 138, C.I. pigment yellow 150, and the like in a color index, and may be used singularly or as a mixture of two or more.

The blue pigment may be a copper phthalocyanine-based blue pigment. Examples of the blue pigment may include without limitation C.I. blue pigment (Color Index Pigment Blue) 15, 15:3, 15:4, 15:6, 60, and the like as a compound classified as a pigment in a color index, and may be used singularly or as a mixture of two or more.

The green pigment may be a halogenated phthalocyanine-based green pigment. Examples of the green pigment may include without limitation C.I. green pigment (Color Index Pigment Green) 7, 36, 58, and the like as a compound classified as a pigment in the color index, and may be used singularly or as a mixture of two or more.

The pigment may be itself added to the photosensitive resin composition according to one embodiment or added thereinto as a pigment dispersion including a dispersing agent, a solvent, and the like.

Herein, the dispersing agent included in the pigment dispersion may be optionally a non-ionic dispersing agent, an ionic dispersing agent and/or a cationic dispersing agent. Examples of the dispersing agent may include, for example polyalkylene glycols and esters thereof; polyoxyalkylenes; polyhydric alcohol ester alkyleneoxide addition products; alcohol alkyleneoxide addition products; alkylamines; and the like that may be used singularly or in a combination thereof. The dispersing agent may be included in an amount of about 10 parts by weight to about 20 parts by weight based on about 100 parts by weight of the pigment.

Examples of a solvent included in the pigment dispersion composition may include without limitation ethylene glycolacetate, ethylcellosolve, propylene glycol methyletheracetate, ethyllactate, polyethylene glycol, cyclohexanone, propylene glycolmethylether, and the like, and combinations thereof. Herein, the amount of the solvent may be adjusted, so that a solid content may be in a range of about 5 wt % to about 30 wt % of the pigment dispersion.

The pigment may have a particle diameter determined by considering dispersion stability, a pixel resolution, and the like, for example, an average particle diameter ranging from about 30 nm to about 200 nm.

The photosensitive resin composition may include the pigment in an amount of about 10 wt % to about 40 wt %, for example, about 10 wt % to about 30 wt %, based on 100 wt % of the photosensitive resin composition. In some embodiments, the photosensitive resin composition may include the pigment in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the amount of the pigment can be in a range from about any of the foregoing amounts to about any other of the foregoing amounts.

When the pigment is used in an amount within the above range, color reproducibility, formative properties of a pattern, close-contacting properties, curing characteristics, and the like may be excellent.

The pigment and the dye may be mixed in a weight ratio of about 5:5 to about 9.9:0.1, for example, about 6:4 to about 9:1. When the pigment and the dye are used in amounts within the above weight ratio range, a high contrast ratio may not only be obtained but color characteristics can also be maintained.

The photosensitive resin composition may include the colorant in an amount of about 3 wt % to about 55 wt % based on 100 wt % of the photosensitive resin composition. In some embodiments, the photosensitive resin composition may include the colorant in an amount of about 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, or 55 wt %. Further, according to some embodiments of the present invention, the amount of the colorant can be in a range from about any of the foregoing amounts to about any other of the foregoing amounts.

(A) Acrylic-Based Binder Resin

The acrylic-based binder resin may help formation of a pixel having a desired resolution during development and simultaneously, secure dispersion stability of the above dye and pigment and the like.

The acrylic-based binder resin is a copolymer of a first ethylenic unsaturated monomer and a second ethylenic unsaturated monomer that is copolymerizable therewith, and is a resin including at least one acrylic-based repeating unit.

The first ethylenic unsaturated monomer is an ethylenic unsaturated monomer including at least one carboxyl group. Examples of the monomer include without limitation acrylic acid, methacrylic acid, maleic acid, itaconic acid, fumaric acid, and the like, and combinations thereof.

The first ethylenic unsaturated monomer may be included in an amount of about 5 to about 50 wt %, for example about 10 to about 40 wt %, based on the total amount (total weight, 100 wt %) of the acrylic-based binder resin.

Examples of the second ethylenic unsaturated monomer may include without limitation aromatic vinyl compounds such as styrene, α-methylstyrene, vinyl toluene, vinylbenzylmethylether, and the like; unsaturated carboxylate ester compounds such as methyl(meth)acrylate, ethyl(meth)acrylate, butyl(meth)acrylate, 2-hydroxyethyl(meth)acrylate, 2-hydroxy butyl(meth)acrylate, benzyl(meth)acrylate, cyclohexyl(meth)acrylate, phenyl(meth)acrylate, and the like; unsaturated carboxylic acid amino alkyl ester compounds such as 2-aminoethyl(meth)acrylate, 2-dimethylaminoethyl(meth)acrylate, and the like; carboxylic acid vinyl ester compounds such as vinyl acetate, vinyl benzoate, and the like; unsaturated carboxylic acid glycidyl ester compounds such as glycidyl(meth)acrylate, and the like; vinyl cyanide compounds such as (meth)acrylonitrile and the like; unsaturated amide compounds such as (meth)acrylamide, and the like; and the like. These may be used singularly or as a mixture of two or more.

Examples of the acrylic-based binder resin may include without limitation a (meth)acrylic acid/benzylmethacrylate copolymer, a (meth)acrylic acid/benzylmethacrylate/styrene copolymer, a (meth)acrylic acid/benzylmethacrylate/2-hydroxyethyl methacrylate copolymer, a (meth)acrylic acid/benzylmethacrylate/styrene/2-hydroxyethyl methacrylate copolymer, and the like. These may be used singularly or as a mixture of two or more.

The acrylic-based binder resin may have a weight average molecular weight of about 6,000 g/mol to about 50,000 g/mol, for example about 6,000 g/mol to about 16,000 g/mol. When the acrylic-based binder resin has a weight average molecular weight within the above range, the photosensitive resin composition may have excellent physical and chemical properties and an appropriate viscosity, maintain appropriate developability and sensitivity, and show excellent close-contacting (adhesive) properties to a substrate during manufacture of a color filter.

The acrylic-based binder resin may have an acid value of about 100 mgKOH/g to about 140 mgKOH/g. When the acrylic-based binder resin has an acid value within the above range, a pixel can have excellent resolution.

The photosensitive resin composition may include the acrylic-based binder resin in an amount of about 1 wt % to about 40 wt %, for example about 1 wt % to about 20 wt %, based on the total amount (total weight, 100 wt %) of the photosensitive resin composition. In some embodiments, the photosensitive resin composition may include the acrylic-based binder resin in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the amount of the acrylic-based binder resin can be in a range from about any of the foregoing amounts to about any other of the foregoing amounts.

When the acrylic-based binder resin is included in an amount within the above range, developability may be improved and excellent surface smoothness may be improved due to improved cross-linking during the manufacture of a color filter.

(B) Photopolymerizable Monomer

The photopolymerizable monomer may be a mono-functional and/or multi-functional ester of (meth)acrylic acid including at least one ethylenic unsaturated double bond.

The photopolymerizable monomer has the ethylenic unsaturated double bond and thus, may cause sufficient polymerization during exposure in a pattern-forming process and form a pattern having excellent heat resistance, light resistance, and chemical resistance.

Examples of the photopolymerizable monomer may include without limitation ethylene glycol di(meth)acrylate, diethylene glycol di(meth)acrylate, triethylene glycol di(meth)acrylate, propylene glycol di(meth)acrylate, neopentyl glycol di(meth)acrylate, 1,4-butanediol di(meth)acrylate, 1,6-hexanediol di(meth)acrylate, bisphenol A di(meth)acrylate, pentaerythritol di(meth)acrylate, pentaerythritol tri(meth)acrylate, pentaerythritol tetra(meth)acrylate, pentaerythritol hexa(meth)acrylate, dipentaerythritol di(meth)acrylate, dipentaerythritol tri(meth)acrylate, dipentaerythritol penta(meth)acrylate, dipentaerythritol hexa(meth)acrylate, bisphenol A epoxy(meth)acrylate, ethylene glycol monomethylether (meth)acrylate, trimethylol propane tri(meth)acrylate, tris(meth)acryloyloxyethyl phosphate, novolacepoxy (meth)acrylate, and the like, and combinations thereof.

Commercially available examples of the reactive unsaturated compound include the following without limitation. Examples of the mono-functional (meth)acrylic acid ester may include without limitation Aronix M-101®, M-111®, and/or M-114® (Toagosei Chemistry Industry Co., Ltd.); KAYARAD TC-110S® and/or TC-120S® (Nippon Kayaku Co., Ltd.); V-158® and/or V-2311® (Osaka Organic Chemical Ind., Ltd.), and the like. Examples of a difunctional (meth)acrylic acid ester may include without limitation Aronix M-210®, M-240®, and/or M-6200® (Toagosei Chemistry Industry Co., Ltd.), KAYARAD HDDA®, HX-220®, and/or R-604® (Nippon Kayaku Co., Ltd.), V-260®, V-312®, and/or V-335 HP® (Osaka Organic Chemical Ind., Ltd.), and the like. Examples of a tri-functional (meth)acrylic acid ester may include without limitation Aronix M-309®, M-400®, M-405®, M-450®, M-7100®, M-8030®, and/or M-8060® (Toagosei Chemistry Industry Co., Ltd.), KAYARAD TMPTA®, DPCA-20®, DPCA-30®, DPCA-60®, and/or DPCA-120® (Nippon Kayaku Co., Ltd.), V-295®, V-300®, V-360®, V-GPT®, V-3PA®, and/or V-400® (Osaka Yuki Kayaku Kogyo Co. Ltd.), and the like. These may be used singularly or as a mixture of two or more.

The photopolymerizable monomer may be treated with acid anhydride to improve developability.

The photosensitive resin composition may include the photopolymerizable monomer in an amount of about 1 wt % to about 30 wt %, for example about 5 wt % to about 10 wt %, based on the total amount (total weight, 100 wt %) of the photosensitive resin composition. In some embodiments, the photosensitive resin composition may include the photopolymerizable monomer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments of the present invention, the amount of the photopolymerizable monomer can be in a range from about any of the foregoing amounts to about any other of the foregoing amounts.

When the photopolymerizable monomer is included in an amount within the above range, the photopolymerizable monomer can be sufficiently cured during exposure in a pattern-forming process and can have excellent reliability, and developability for alkali developing solution may be improved.

(C) Photopolymerization Initiator

Examples of the photopolymerization initiator may include without limitation acetophenone-based compounds, benzophenone-based compounds, thioxanthone-based compounds, benzoin-based compounds, triazine-based compounds, oxime-based compounds, and the like, and combinations thereof.

Examples of the acetophenone-based compound may include without limitation 2,2'-diethoxy acetophenone, 2,2'-dibutoxy acetophenone, 2-hydroxy-2-methylpropinophenone, p-t-butyltrichloro acetophenone, p-t-butyldichloro acetophenone, 4-chloro acetophenone, 2,2'-dichloro-4-phenoxy acetophenone, 2-methyl-1-(4-(methylthio)phenyl)-2-morpholinopropan-1-one, 2-benzyl-2-dimethylamino-1-(4-morpholinophenyl)-butan-1-one, and the like, and combinations thereof.

Examples of the benzophenone-based compound may include without limitation benzophenone, benzoyl benzoate, benzoyl benzoate methyl ester, 4-phenyl benzophenone, hydroxy benzophenone, acrylated benzophenone, 4,4'-bis(dimethyl amino)benzophenone, 4,4'-bis(diethylamino)benzophenone, 4,4'-dimethylaminobenzophenone, 4,4'-dichlorobenzophenone, 3,3'-dimethyl-2-methoxybenzophenone, and the like, and combinations thereof.

Examples of the thioxanthone-based compound may include without limitation thioxanthone, 2-chlorothioxanthone, 2-methylthioxanthone, isopropyl thioxanthone, 2,4-diethyl thioxanthone, 2,4-diisopropyl thioxanthone, and the like, and combinations thereof.

Examples of the benzoin-based compound may include without limitation benzoin, benzoin methyl ether, benzoin ethyl ether, benzoin isopropyl ether, benzoin isobutyl ether, benzyldimethylketal, and the like, and combinations thereof.

Examples of the triazine-based compound may include without limitation 2,4,6-trichloro-s-triazine, 2-phenyl-4,6-bis(trichloromethyl)-s-triazine, 2-(3',4'-dimethoxystyryl)-4,6-bis(trichloromethyl)-s-triazine, 2-(4'-methoxynaphthyl)-4,6-bis(trichloromethyl)-s-triazine, 2-(p-methoxyphenyl)-4,6-bis(trichloromethyl)-s-triazine, 2-(p-tolyl)-4,6-bis(trichloro methyl)-s-triazine, 2-biphenyl-4,6-bis(trichloro methyl)-s-triazine, bis(trichloromethyl)-6-styryl-s-triazine, 2-(naphtho-1-yl)-4,6-bis(trichloromethyl)-s-triazine, 2-(4-methoxynaphtho-1-yl)-4,6-bis(trichloromethyl)-s-triazine, 2,4-bis(trichloromethyl)-6-piperonyl-s-triazine, 2,4-bis(trichloromethyl)-6-(4-methoxystyryl)-s-triazine, and the like, and combinations thereof.

Examples of the oxime-based compound may include without limitation 2-(O-benzoyloxime)-1-[4-(phenylthio)phenyl]-1,2-octanedione, 1-(O-acetyloxime)-1-[9-ethyl-6-(2-methylbenzoyl)-9H-carbazol-3-yl]ethanone, and the like, and combinations thereof.

The photopolymerization initiator may further include one or more of a carbazole-based compound, a diketone-based compound, a sulfonium borate-based compound, a diazo-based compound, an imidazole-based compound, a biimidazole-based compound, and the like instead of or in addition to one of the above compounds.

The photosensitive resin composition may include the photopolymerization initiator in an amount of about 0.1 wt % to about 10 wt %, for example about 0.1 wt % to about 5 wt %, based on the total amount (total weight, 100 wt %) of the photosensitive resin composition. In some embodiments, the photosensitive resin composition may include the photopolymerization initiator in an amount of about 0.1, 0.2, 0.3, 0.4, 0.5, 0.6, 0.7, 0.8, 0.9, 1, 2, 3, 4, 5, 6, 7, 8, 9, or 10 wt %. Further, according to some embodiments of the present invention, the amount of the photopolymerization initiator can be in a range from about any of the foregoing amounts to about any other of the foregoing amounts.

When the photopolymerization initiator is included in an amount within the above range, sufficient photopolymerization can occur during exposure in a pattern-forming process, and transmittance may be prevented from deterioration due to a non-reaction initiator.

(E) Solvent

The solvent is a material having compatibility with the colorant, the acrylic-based binder resin, the photopolymerizable monomer, and the photopolymerization initiator but not reacting therewith.

The solvent is not particularly limited. Examples of the solvent may include without limitation alcohols such as methanol, ethanol and the like; ethers such as dichloroethyl ether, n-butyl ether, diisoamyl ether, methylphenyl ether, tetrahydrofuran, and the like; glycol ethers such ethylene glycol methylether, ethylene glycol ethylether, propylene glycol methylether and the like; cellosolve acetates such as methyl cellosolve acetate, ethyl cellosolve acetate, diethyl cellosolve acetate, and the like; carbitols such methylethyl carbitol, diethyl carbitol, diethylene glycol monomethylether, diethylene glycol monoethylether, diethylene glycol dimethylether, diethylene glycol methylethylether, diethylene glycol diethylether, and the like; alkyl acetates such n-butyl acetate, n-pentyl acetate, n-hexyl acetate, isobutyl acetate, and the like; propylene glycol alkylether acetates such as propylene glycol methylether acetate, propylene glycol propylether acetate, and the like; aromatic hydrocarbons such as toluene, xylene, and the like; ketones such as methylethylketone, cyclohexanone, 4-hydroxy-4-methyl-2-pentanone, methyl-n-propylketone, methyl-n-butylketone, methyl-n-amylketone, 2-heptanone, and the like; saturated aliphatic monocarboxylic acid alkyl esters such as ethyl acetate, n-butyl acetate, isobutyl acetate, and the like; alkyl lactate esters such as methyl lactate, ethyl lactate, and the like; hydroxyacetic acid alkyl esters such as methyl hydroxyacetate, ethyl hydroxyacetate, butyl hydroxyacetate, and the like; alkoxyalkyl acetate esters such as methoxymethyl acetate, methoxyethyl acetate, methoxybutyl acetate, ethoxymethyl acetate, ethoxyethyl acetate, and the like;

3-hydroxypropionic acid alkyl esters such as methyl 3-hydroxypropionate, ethyl 3-hydroxypropionate, and the like; 3-alkoxypropionic acid alkyl esters such as methyl 3-methoxypropionate, ethyl 3-methoxypropionate, ethyl 3-ethoxypropionate, methyl 3-ethoxypropionate, and the like; 2-hydroxypropionic acid alkyl esters such as methyl 2-hydroxypropionate, ethyl 2-hydroxypropionate, propyl 2-hydroxypropionate, and the like; 2-alkoxypropionic acid alkyl esters such as methyl 2-methoxypropionate, ethyl 2-methoxypropionate, ethyl 2-ethoxypropionate, methyl 2-ethoxypropionate, and the like; 2-hydroxy-2-methylpropionic acid alkyl esters such as methyl 2-hydroxy-2-methylpropionate, ethyl 2-hydroxy-2-methylpropionate, and the like; 2-alkoxy-2-methylpropionic acid alkyl esters such as methyl 2-methoxy-2-methylpropionate, ethyl 2-ethoxy-2-methylpropionate, and the like; esters such as 2-hydroxyethyl propionate, 2-hydroxy-2-methylethyl propionate, hydroxyethyl acetate, methyl 2-hydroxy-3-methylbutanoate, and the like; ketonate esters such as ethyl pyruvate, and the like, and combinations thereof. Additionally, a solvent such as N-methylformamide, N,N-dimethylformamide, N-methylformanilide, N-methylacetamide, N,N-dimethylacetamide, N-methylpyrrolidone, dimethylsulfoxide, benzylethylether, dihexylether, acetylacetone, isophorone, caproic acid, caprylic acid, 1-octanol, 1-nonanol, benzylalcohol, benzyl acetate, ethyl benzoate, diethyl oxalate, diethyl maleate, γ-butyrolactone, ethylene carbonate, propylene carbonate, phenyl cellosolve acetate, and the like, and combinations thereof may be also used. The solvents may be used singularly or as a mixture of two or more.

Considering miscibility and reactivity, glycol ethers such as ethylene glycol monoethyl ether, and the like; ethylene glycol alkylether acetates such as ethyl cellosolve acetate, and the like; esters such as 2-hydroxyethyl propionate, and the like; diethylene glycols such as diethylene glycol monomethyl ether, and the like; and/or propylene glycol alkylether acetates such as propylene glycol monomethylether acetate, propylene glycol propylether acetate and the like may be used.

The solvent is used in a balance amount, for example about 40 wt % to about 70 wt % based on the total amount (total weight, 100 wt %) of the photosensitive resin composition. In some embodiments, the photosensitive resin composition may include the solvent in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments of the present invention, the amount of the solvent can be in a range from about any of the foregoing amounts to about any other of the foregoing amounts.

When the solvent is included in an amount within the above range, the photosensitive resin composition can have improved processability due to an appropriate viscosity during manufacture of a color filter.

(F) Other Additive(s)

The photosensitive resin composition may further include one or more other additives such as but not limited to malonic acid; 3-amino-1,2-propanediol; a coupling agent including a vinyl group or a (meth)acryloxy group; a leveling agent; a surfactant such as a fluorine-based surfactant; and/or a radical polymerization initiator, in order to prevent stains or spots during the coating, to adjust leveling, and/or to prevent pattern residue due to non-development.

The amount of the additive may be controlled depending on desired properties.

The coupling agent may be a silane-based coupling agent. Examples of the silane-based coupling agent may include without limitation trimethoxysilyl benzoic acid, γ-methacryl oxypropyl trimethoxysilane, vinyl triacetoxysilane, vinyl trimethoxysilane, γ-iso cyanate propyl triethoxysilane, γ-glycidoxy propyl trimethoxysilane, β-(3,4-epoxycyclohexyl)ethyltrimethoxysilane, and the like. These may be used singularly or in a mixture of two or more.

The silane-based coupling agent may be used in an amount of about 0.01 part by weight to about 1 part by weight based on about 100 parts by weight of the photosensitive resin composition for a color filter.

The photosensitive resin composition for a color filter may further include a surfactant as needed.

Examples of the surfactant may include without limitation F-482, F-484, F-478, and the like, and combinations thereof, which are commercially available from of DIC Co., Ltd.

The surfactant may be included in an amount of about 0.01 wt % to about 5 wt %, for example about 0.1 wt % to about 2 wt %, based on the total amount (total weight, 100 wt %) of the photosensitive resin composition. When the surfactant is used in an amount outside of the above range, a problem that impurities are generated after development may occur.

The photosensitive resin composition according to one embodiment may be an alkali development type capable of being cured by radiating light and being developed with an alkali aqueous solution. When the photosensitive resin composition is laminated on a substrate and radiated by an actinic ray to form a pattern for a color filter, the photosensitive resin composition is reacted by the actinic ray and thus sharply deteriorates solubility a reaction region compared with a non-reaction region. Accordingly, only the non-reaction region may be selectively dissolved. In this way, the solution removing a non-exposure region is called to be a developing solution, and this developing solution is classified into two types such as an organic solvent type and an alkali development type. Since the organic solvent type developing solution can cause an atmosphere contamination and can harm the human body, the alkali development type solution may be used in terms of environment. The photosensitive resin composition according to one embodiment uses an alkali development type solution and thus may be usefully used in terms of environment.

Another embodiment provides a color filter manufactured using the above photosensitive resin composition.

An exemplary method of manufacturing the color filter is as follows.

The above photosensitive resin composition can be coated to form an about 0.5 μm to about 10 μm-thick resin composition layer on a glass substrate in an appropriate method such as spin coating, roller coating, spray coating, and the like.

Subsequently, the substrate having the resin composition layer can be radiated by light (exposed to light) to form a pattern required for a color filter. The radiation may be performed by using UV, an electron beam, or an X-ray as a light source, for example, UV in a range of about 190 nm to about 450 nm, for example about 200 nm to about 400 nm. The radiation may be performed by further using a photoresist mask. After performing the radiation process in this way, the resin composition layer exposed to the light source can be treated with a developing solution. Herein, a non-exposure region in the resin composition layer is dissolved and forms the pattern required for a color filter. This process can be repeated according to the number of necessary colors, obtaining a color filter having a desired pattern. In addition, crack resistance, solvent resistance, and the like may be improved by reheating the image pattern obtained through the development, radiating an actinic ray thereinto, or the like to cure it.

Hereinafter, the present invention is illustrated in more detail with reference to the following examples. These examples, however, are not in any sense to be interpreted as limiting the scope of the invention.

Preparation of Dye

Preparation Example 1

(1) 5 g of thiosalicylic acid, 150 ml of 2-propanol, and 10 ml of sulfuric acid are put in a 250 ml flask and reflux-agitated while heated at 100° C. When the reaction is complete, the resultant is extracted with 200 ml of EA (ethyl acetate), an extract obtained therefrom is several times with purified water in which sodium bicarbonate is dissolved, and a solvent is removed therefrom, obtaining a product A-1 in a liquid state. The product A-1 in a liquid state is vacuum-dried, obtaining a product A-1 (isopropyl 2-mercaptobenzoate).

(2) 3 g of the product A-1 (isopropyl 2-mercaptobenzoate), 2.6 g of 3-nitrophthalonitrile, 3.2 g of potassium carbonate, and 50 ml of DMF are put in a 100 ml flask and then, agitated at 50° C. while heated. When the reaction is complete, the resultant is extracted with 150 ml of EA, and the obtained extract is several times washed with purified water and then, purified through column chromatography after removing a solvent therefrom. 2 g of the obtained solid is put in 100 ml of dichloromethane, and the mixture is agitated. 4.2 g of 3-chloroperbenzoic acid is added thereto, and the resulting mixture is agitated. When the reaction is complete, the resultant is extracted with 100 ml of EA (ethyl acetate), and the obtained extract is several times washed with purified water in which sodium bicarbonate is dissolved and purified through column chromatography. The obtained product is vacuum-dried, obtaining a compound product A-2 (isopropyl 2-(2,3-dicyanophenylsulfonyl)benzoate).

(3) 3 g of isopropyl 2-mercaptobenzoate, 2.6 g of 4-nitrophthalonitrile, 3.2 g of potassium carbonate, and 50 ml of DMF are put in a 100 ml flask and then, agitated while heated at 50° C. When the reaction is complete, the resultant is extracted with 150 ml of EA, and the obtained extract is several times washed with purified water and then, purified through column chromatography after removing a solvent therein. 2 g of the obtained solid is put in 100 ml of dichloromethane, and the mixture is agitated. 4.2 g of 3-chloroperbenzoic acid is added thereto, and the resulting mixture is agitated. When the reaction is complete, the resultant is extracted with 100 ml of EA (ethyl acetate), and the obtained extract is several times washed with purified water in which sodium bicarbonate is dissolved and purified through column chromatography. The obtained product is vacuum-dried, obtaining a compound product A-3 (isopropyl 2-(3,4-dicyanophenylsulfonyl)benzoate).

(4) 1 g of the product A-3 (isopropyl 2-(3,4-dicyanophenylsulfonyl)benzoate), 0.33 g of the product A-2 (isopropyl 2-(2,3-dicyanophenylsulfonyl)benzoate), 0.7 g of 1,8-diazabicycloundec-7-ene, and 10 mL of 1-pentenol are put in a 100 mL flask and heated to dissolve the solids. Then, 0.17 g of copper acetate is added thereto, and the resulting mixture is refluxed while heated. When the reaction is complete, the resultant is purified through column chromatography after removing a solvent therein. Dichloromethane is appropriately added to the obtained solid to dissolve the solid, and methanol is added thereto for crystallization. Herein, the obtained solid is filtered and vacuum-dried, obtaining a dye represented by the following Chemical Formula 11.

[Chemical Formula 11]

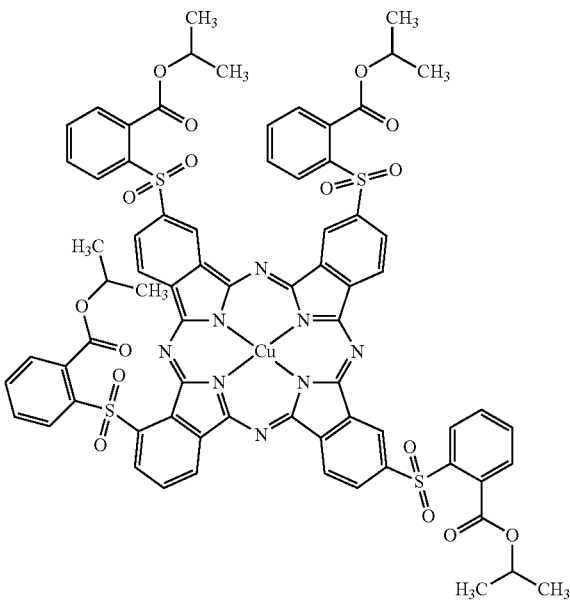

Preparation Example 2

A dye represented by the following Chemical Formula 12 is obtained according to the same method as Preparation Example 1 except for using 1.33 to g of isopropyl 2-(3,4-dicyanophenylsulfonyl)benzoate instead of 1 g of the isopropyl 2-(3,4-dicyanophenylsulfonyl)benzoate and 0.33 g of the isopropyl 2-(2,3-dicyanophenylsulfonyl)benzoate.

[Chemical Formula 12]

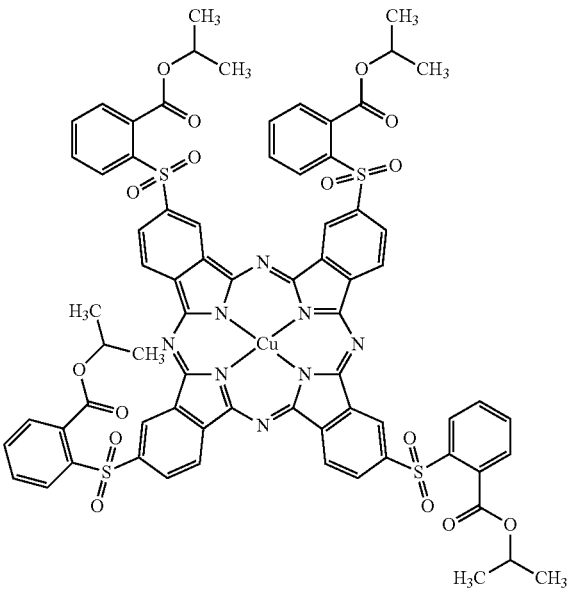

Preparation Example 3

A dye represented by the following Chemical Formula 13 is obtained according to the same method as Preparation Example 1 except for using 1 g of isopropyl 2-(3,4-dicyanophenylsulfonyl)benzoate and 0.34 g of 4-(dodecylsulfonyl)phthalonitrile instead of 1 g of the Isopropyl 2-(3,4-dicyanophenylsulfonyl)benzoate and 0.33 g of the isopropyl 2-(2,3-dicyanophenylsulfonyl)benzoate.

[Chemical Formula 13]

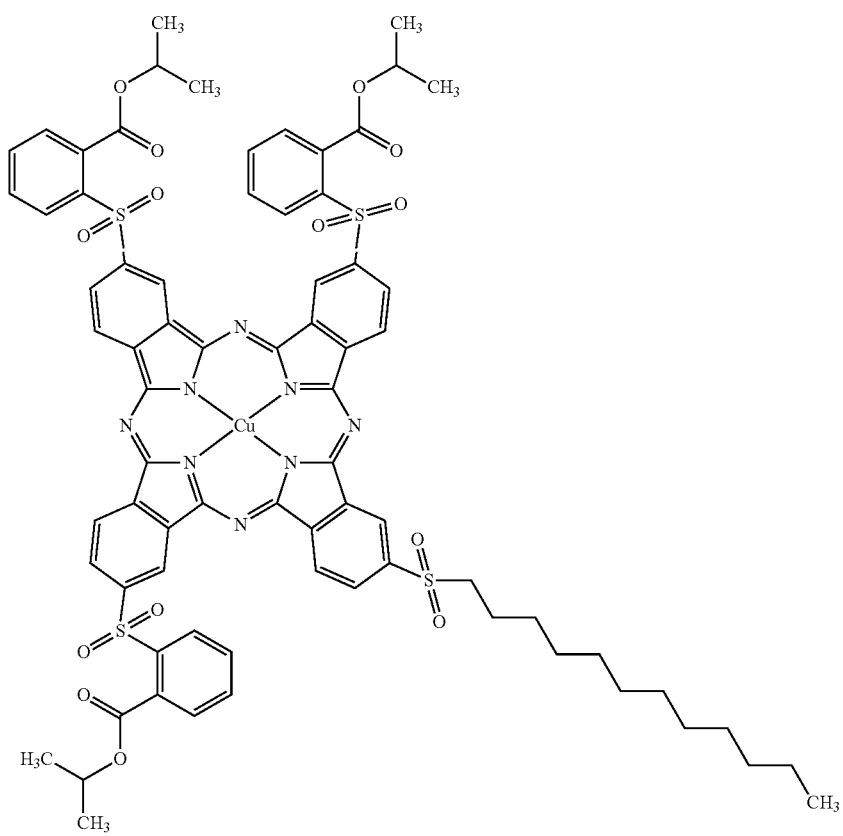

Preparation Example 4

A dye represented by the following Chemical Formula 14 is obtained according to the same method as Preparation Example 1 except for using 1 g of 4-tert-butylphthalonitrile and 0.33 g of isopropyl 4-(2,3-dicyanophenoxyl)benzoate instead of 1 g of the Isopropyl 2-(3,4-dicyanophenylsulfonyl)benzoate and 0.33 g of isopropyl 2-(2,3-dicyanophenylsulfonyl)benzoate.

[Chemical Formula 14]

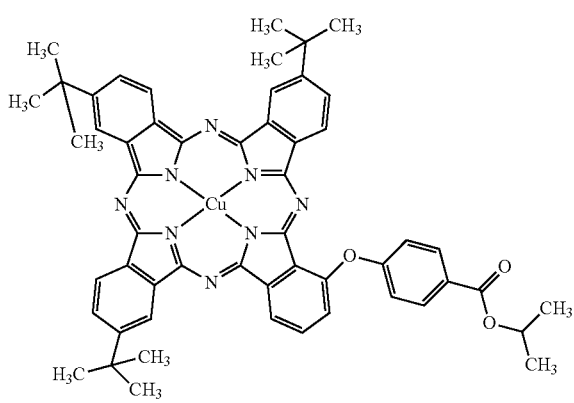

Preparation of Photosensitive Resin Composition

Examples 1 to 3 and Comparative Examples 1 to 4

The following photopolymerization initiator is dissolved in the following solvent in a composition provided in the following Table 1, and the solution is agitated at room temperature for 2 hours. Subsequently, an acrylic-based binder resin and a photopolymerizable monomer are added thereto, and the mixture is agitated at room temperature for 2 hours. Subsequently, a pigment and a dye are added thereto, the mixture is agitated at room temperature for one hour, a surfactant is added thereto, and the resulting mixture is agitated at room temperature for one hour. The solution is three times filtered to remove impurities therein, preparing each photosensitive resin composition according to Examples 1 to 3 and Comparative Examples 1 to 4. The photosensitive resin composition is prepared by using the following components.

(A) Binder Resin (A-1) Acrylic-based binder resin (CF-1069, WAKO Chemicals Inc.)

(A-2) Acrylic-based binder resin (CRA-029, Cheil Industries Inc.)

(A-3) Epoxy binder resin (EHPE-3150, DAICEL Corp.)

(A-4) Binder resin (CRA-022, Cheil Industries Inc.)

(B) Photopolymerizable Monomer (B-1) photopolymerizable monomer (dipentaerythritol-hexaacrylate (DPHA))

(B-2) photopolymerizable monomer (developability improvement-type) (A-BPE-20, SHIN-NAKAMURA CHEMICAL Co., Ltd.)

(C) Photopolymerization Initiator (C-1) Oxime-based compound (IRGARCURE OXE01, BASF Corp.)

(D) Colorant (Pigment)

(D-1) Main color pigment (TS117, TOYO INK Group)

(D-2) Color pigment for toning (SF Blue GC1207, SANYO COLOR WORKS Ltd.)

(D-3) Color pigment for addition (KCF BLUE B, KISCO Ltd.)

(Dye)

(D-4) Dye of Preparation Example 1

(D-5) Dye of Preparation Example 2

(D-6) Dye of Preparation Example 3

(D-7) Dye of Preparation Example 4

(E) Solvent (E-1) Propylene glycolmonomethyl ether acetate (PG-MEA)

(F) Additive (F-1) Surfactant (F-559, DIC Co., Ltd.)

TABLE 1

(unit: wt %)

|  |  | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|---|
| (A) Binder resin | A-1 | 4.89 | 4.89 | 4.89 | — | — | — | — |
|  | A-2 | — | — | — | 6.06 | 4.89 | 4.99 | 5.07 |
|  | A-3 | 0.90 | 0.90 | 0.90 | 0.75 | 0.90 | 0.90 | 0.91 |
|  | A-4 | 2.16 | 2.16 | 2.16 | 1.79 | 2.16 | 2.15 | 2.19 |
| (B) Photopolymerizable monomer | B-1 | 8.39 | 8.39 | 8.39 | 8.51 | 8.39 | 8.35 | 8.48 |
|  | B-2 | 0.93 | 0.93 | 0.93 | 0.74 | 0.93 | 0.93 | 0.94 |
| (C) Photopolymerization initiator | C-1 | 1.00 | 1.00 | 1.00 | 0.62 | 1.00 | 1.00 | 1.02 |
| (D) Pigment Colorant | D-1 | 3.63 | 3.63 | 3.63 | 11.53 | 3.63 | 3.51 | 2.85 |
|  | D-2 | 6.27 | 6.27 | 6.27 | 7.60 | 6.27 | 7.83 | 6.36 |
|  | D-3 | 10.10 | 10.10 | 10.10 | 4.02 | 10.10 | 9.78 | 7.95 |
| Dye | D-4 | 7.26 | — | — | — | — | 2.11 | 17.12 |
|  | D-5 | — | 7.26 | — | — | — | — | — |
|  | D-6 | — | — | 7.26 | — | — | — | — |
|  | D-7 | — | — | — | — | 7.26 | — | — |
| (E) Solvent | E-1 | 54.17 | 54.17 | 54.17 | 58.08 | 54.17 | 58.15 | 46.81 |
| (F) Additive | F-1 | 0.30 | 0.30 | 0.30 | 0.30 | 0.30 | 0.30 | 0.30 |
| Total |  | 100.00 | 100.00 | 100.00 | 100.00 | 100.00 | 100.00 | 100.00 |

Evaluation: Color Characteristics and Heat Resistance of Photosensitive Resin Composition Each photosensitive resin composition according to Examples 1 to 3 and Comparative Examples 1 to 4 is respectively coated on a glass substrate with a coating equipment (MIKASA Co., Ltd.) and dried on a hot plate at 90° C., obtaining a film. The film is exposed to light with 50 mJ/cm² of an exposure dose and baked at an oven condition of 210° C. for 20 minutes. Color coordinate and luminance of the film are measured by using a spectrophotometer (Otsuka Electronics Co., Ltd., MCPD 3000) before and after post-baking (PSB), a difference before and after the post-baking is calculated to examine heat resistance properties, and the results are provided in the following Table 2 and Table 3. Color coordinate (Gx) and luminance (Y) are calculated based on the color coordinate (Gy).

TABLE 2

| Step |  | Color coordinate (Gx) | Color coordinate (Gy) | Luminance (Y) | Contrast ratio |
|---|---|---|---|---|---|
| Example 1 | Before PSB | 0.1407 | 0.1120 | 14.98 |  |
|  | After PSB | 0.1402 | 0.1120 | 15.05 | 12920 |
| Example 2 | Before PSB | 0.1410 | 0.1120 | 14.99 |  |
|  | After PSB | 0.1406 | 0.1120 | 15.06 | 12983 |
| Example 3 | Before PSB | 0.1411 | 0.1120 | 14.99 |  |
|  | After PSB | 0.1406 | 0.1120 | 15.00 | 12916 |
| Comparative Example 1 | Before PSB | 0.1401 | 0.1120 | 14.98 |  |
|  | After PSB | 0.1399 | 0.1120 | 14.62 | 12938 |
| Comparative Example 2 | Before PSB | 0.1409 | 0.1120 | 15.02 |  |
|  | After PSB | 0.1406 | 0.1120 | 14.89 | 9146 |
| Comparative Example 3 | Before PSB | 0.1398 | 0.1120 | 14.95 |  |
|  | After PSB | 0.1397 | 0.1120 | 14.88 | 11350 |
| Comparative Example 4 | Before PSB | 0.1411 | 0.1120 | 15.12 |  |
|  | After PSB | 0.1380 | 0.1120 | 14.55 | 13859 |

TABLE 3

|  | ΔGx | ΔGy | ΔY |
|---|---|---|---|
| Example 1 | −0.0004 | 0.0000 | 0.07 |
| Example 2 | −0.0004 | 0.0000 | 0.07 |
| Example 3 | −0.0005 | 0.0000 | 0.01 |
| Comparative Example 1 | 0.0002 | 0.0000 | −0.36 |
| Comparative Example 2 | −0.0003 | 0.0000 | −0.13 |
| Comparative Example 3 | −0.0001 | 0.0000 | −0.07 |
| Comparative Example 4 | −0.0031 | 0.0000 | −0.57 |

Referring to Tables 2 and 3, the photosensitive resin compositions using the dye of the present invention according to Examples 1 to 3 exhibit excellent luminance and contrast ratio and excellent heat resistance due to a small difference before and after the PSB compared with the photosensitive resin compositions according to Comparative Examples 1 to 4.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. A photosensitive resin composition, comprising:
   (A) an acrylic-based binder resin having an acid value of about 100 mgKOH/g to about 140 mgKOH/g;
   (B) a photopolymerizable monomer;
   (C) a photopolymerization initiator;
   (D) a colorant including a dye represented by the following Chemical Formula 1; and
   (E) a solvent:

[Chemical Formula 1]

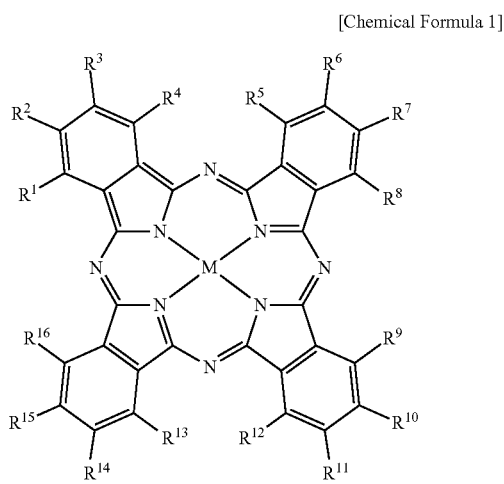

wherein, in the above Chemical Formula 1,
M is Cu, Co, Al, Zn, Ni, Pt, or Cr,
$R^1$ to $R^{16}$ are the same or different and are each independently hydrogen, halogen, a carboxyl group, a hydroxy group, substituted or unsubstituted C1 to C20 alkyl, substituted or unsubstituted C1 to C20 alkoxy, substituted or unsubstituted C3 to C20 cycloalkyl, substituted or unsubstituted C6 to C20 aryl, a substituted or unsubstituted C2 to C20 heterocyclic group, a sulfonyl group represented by the following Chemical Formula 2, or a sulfonyl group represented by the following Chemical Formula 3, with the proviso that at least one of $R^1$ to $R^4$, at least one of $R^5$ to $R^8$, at least one of $R^9$ to $R^{12}$ and at least one of $R^{13}$ to $R^{16}$ are independently a sulfonyl group represented by the following Chemical Formula 2 or a sulfonyl group represented by the following Chemical Formula 3,

[Chemical Formula 2]

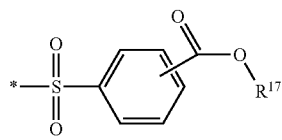

[Chemical Formula 3]

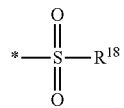

wherein, in the above Chemical Formulae 2 and 3,
$R^{17}$ and $R^{18}$ are the same or different and are each independently substituted or unsubstituted C1 to C20 alkyl, and
wherein the photosensitive resin composition includes the photopolymerizable monomer (B) in an amount of about 1 wt % to about 30 wt %.

2. The photosensitive resin composition of claim 1, wherein, in the above Chemical Formula 1, M is Cu.

3. The photosensitive resin composition of claim 1, wherein the dye is a blue dye.

4. The photosensitive resin composition of claim 3, wherein the blue dye is a phthalocyanine-based blue dye.

5. The photosensitive resin composition of claim 1, comprising the dye in an amount of about 3 wt % to about 15 wt % based on 100 wt % of the photosensitive resin composition.

6. The photosensitive resin composition of claim 1, comprising the dye in an amount of about 5 wt % to about 10 wt % based on 100 wt % of the photosensitive resin composition.

7. The photosensitive resin composition of claim 1, wherein the colorant further comprises a pigment.

8. The photosensitive resin composition of claim 7, comprising the pigment and the dye in a weight ratio of about 5:5 to about 9.9:0.1.

9. The photosensitive resin composition of claim 1, wherein the acrylic-based binder resin has a weight average molecular weight of about 6,000 g/mol to about 50,000 g/mol.

10. The photosensitive resin composition of claim 1, wherein the photosensitive resin composition further comprises:
    about 1 wt % to about 40 wt % of the acrylic-based binder resin (A);
    about 0.1 wt % to about 10 wt % of the photopolymerization initiator (C);
    about 3 wt % to about 55 wt % of the colorant (D); and
    a balance amount of the solvent (E).

11. The photosensitive resin composition of claim 1, wherein the photosensitive resin composition further comprises malonic acid; 3-amino-1,2-propanediol; a silane-based coupling agent having a vinyl group or a (meth)acryloxy group; a leveling agent; a fluorine-based surfactant; a radical polymerization initiator; or a combination thereof.

12. A color filter using the photosensitive resin composition of claim 1.

* * * * *

UNITED STATES PATENT AND TRADEMARK OFFICE
CERTIFICATE OF CORRECTION

PATENT NO. : 9,535,190 B2
APPLICATION NO. : 14/470017
DATED : January 3, 2017
INVENTOR(S) : Se-Young Choi et al.

It is certified that error appears in the above-identified patent and that said Letters Patent is hereby corrected as shown below:

On the Title Page

In the Abstract
Delete Chemical Formula 1 and insert:

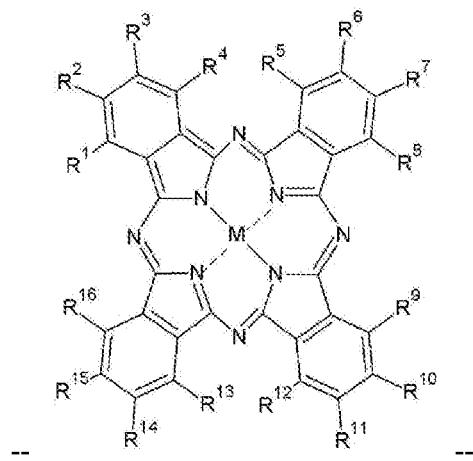

-- --

Signed and Sealed this
Thirtieth Day of May, 2017

Michelle K. Lee
*Director of the United States Patent and Trademark Office*

CERTIFICATE OF CORRECTION (continued)

U.S. Pat. No. 9,535,190 B2

In the Specification

Column 2, delete Chemical Formula 1 and insert:

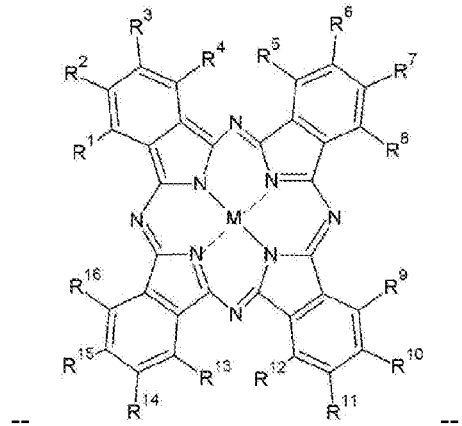

--

Column 4, delete Chemical Formula 1 and insert:

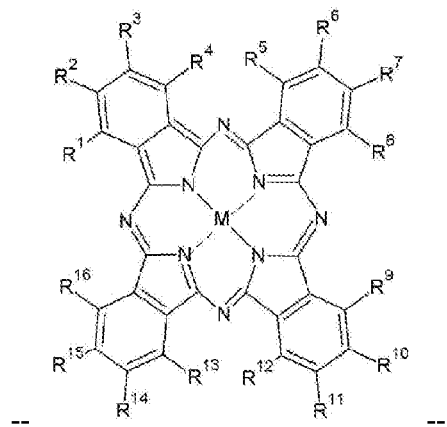

--

Column 14, delete Chemical Formula 11 and insert:

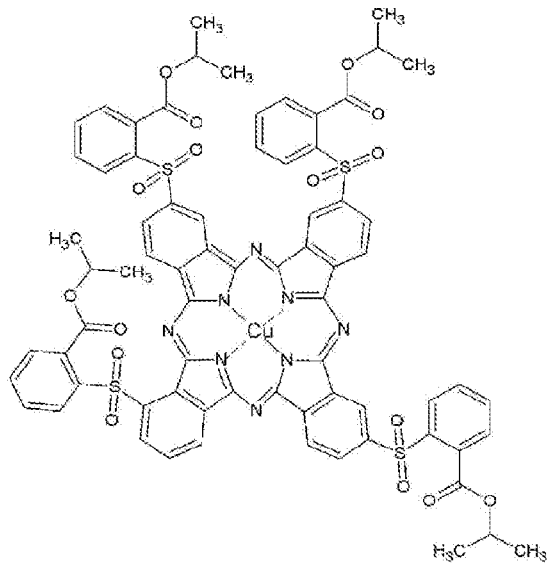

CERTIFICATE OF CORRECTION (continued)
U.S. Pat. No. 9,535,190 B2

Column 14, delete Chemical Formula 12 and insert:

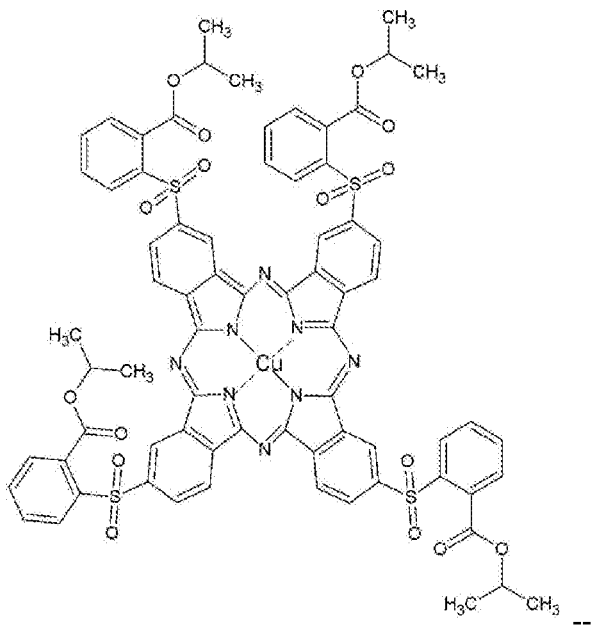

--    --

Columns 15 and 16, delete Chemical Formula 13 and insert:

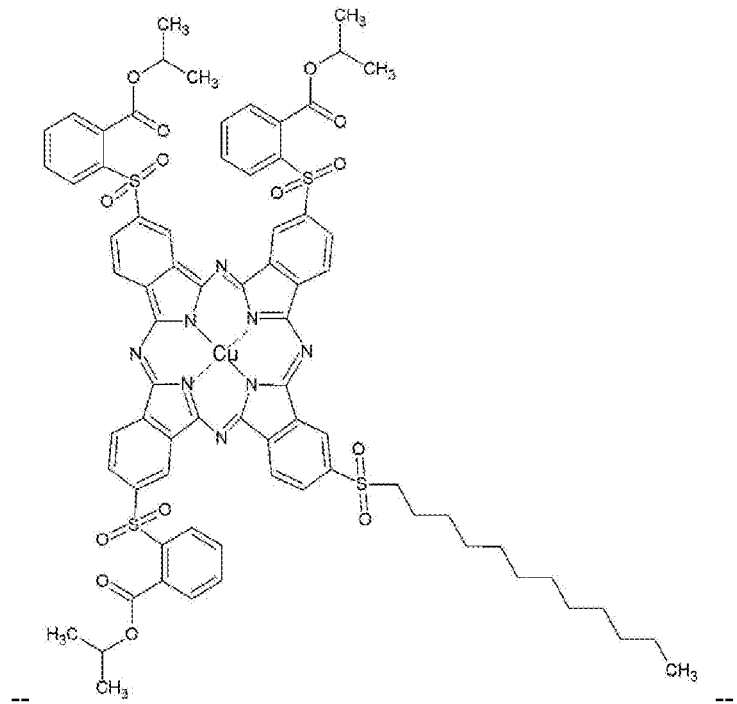

--    --

Column 15, delete Chemical Formula 14 and insert:
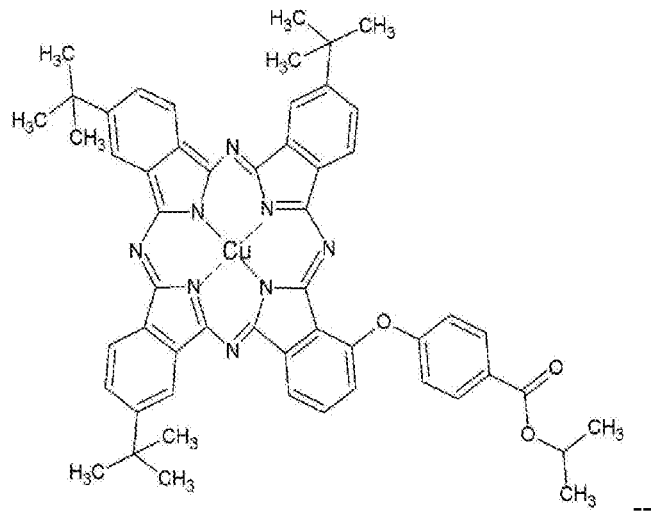
--                    --
In the Claims
Column 19, Claim 1, delete Chemical Formula 1 and insert:
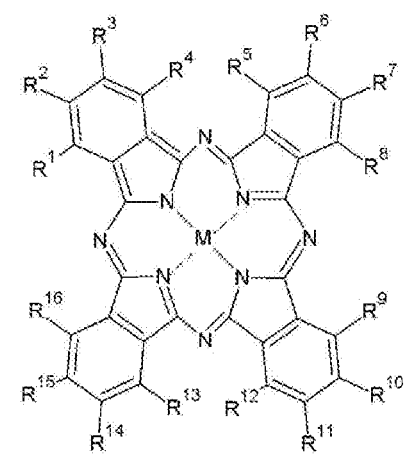
--                    --